United States Patent [19]

Adelmann et al.

[11] 4,252,922

[45] Feb. 24, 1981

[54] POLYCARBONATE MOLDING COMPOSITIONS WITH IMPROVED RESILIENCE PROPERTIES

[75] Inventors: Siegfried Adelmann; Dieter Margotte; Werner Nouvertné; Manfred Schreckenberg, all of Krefeld; Frank Kleiner, Cologne, all of Fed. Rep. of Germany

[73] Assignee: Bayer Aktiengesellschaft, Bayerwerk, Fed. Rep. of Germany

[21] Appl. No.: 16,457

[22] Filed: Feb. 28, 1979

[30] Foreign Application Priority Data

Mar. 10, 1978 [DE]  Fed. Rep. of Germany ....... 2810550

[51] Int. Cl.² ...................... C08L 67/02; C08L 69/00
[52] U.S. Cl. ................................. 525/439; 525/462; 525/466
[58] Field of Search ................. 525/439, 462, 466

[56] References Cited

U.S. PATENT DOCUMENTS

| | | |
|---|---|---|
| 3,000,849 | 9/1961 | Clachan et al. .............. 525/439 |
| 3,030,331 | 4/1962 | Goldberg . |
| 3,030,335 | 4/1962 | Goldberg . |
| 3,069,385 | 12/1962 | Stevens . |
| 3,161,615 | 12/1964 | Goldberg . |
| 3,169,121 | 2/1965 | Goldberg . |
| 3,207,814 | 9/1965 | Goldberg . |
| 3,218,372 | 11/1965 | Okamura et al. ............. 525/466 X |
| 3,220,976 | 11/1965 | Goldberg . |
| 3,244,771 | 4/1966 | Krauss et al. ............... 525/462 X |
| 3,287,442 | 11/1966 | Caldwell et al. . |
| 3,290,409 | 12/1966 | Munro . |
| 3,367,993 | 2/1968 | Caldwell et al. . |
| 3,409,704 | 11/1968 | Bailey . |
| 3,419,635 | 12/1968 | Vaugh . |
| 3,437,632 | 4/1969 | Hechelhammer et al. ..... 260/37 PC |
| 3,449,467 | 6/1969 | Wynstra ..................... 525/58 X |
| 3,461,187 | 8/1969 | Contrill . |
| 3,480,695 | 11/1969 | Hale ......................... 525/462 |
| 3,549,682 | 12/1970 | Vernaleken et al. . |
| 3,553,167 | 1/1971 | Schnell et al. . |
| 3,554,742 | 1/1971 | Gramza et al. ............... 525/466 |
| 3,641,200 | 2/1972 | Matzner . |
| 3,663,471 | 5/1972 | Schirmer et al. . |
| 3,714,125 | 1/1973 | Shima et al. . |
| 3,843,708 | 10/1974 | Matzner . |
| 3,843,752 | 10/1974 | Katoyama et al. . |
| 3,879,347 | 4/1975 | Serini et al. ................ 260/37 PC |
| 3,890,266 | 6/1975 | Serini et al. ................ 260/37 PC |
| 3,936,400 | 2/1976 | Wambach .................... 525/466 |
| 3,998,908 | 12/1976 | Buxbaum ..................... 525/466 |
| 4,001,184 | 1/1977 | Scott ......................... 528/176 |
| 4,081,495 | 3/1978 | Freitag et al. .............. 260/37 PC |
| 4,105,633 | 8/1978 | Swart et al. ................. 528/176 |
| 4,169,868 | 10/1979 | Schreckenberg et al. ...... 525/439 |

FOREIGN PATENT DOCUMENTS

| | | |
|---|---|---|
| 668153 | 8/1963 | Canada ............................ 525/462 |
| 685761 | 5/1964 | Canada ............................ 525/462 |
| 702625 | 1/1965 | Canada ............................ 525/462 |
| 2235965 | 1/1975 | France . |
| 898775 | 6/1962 | United Kingdom . |
| 954500 | 4/1964 | United Kingdom . |
| 965085 | 7/1964 | United Kingdom . |
| 1042418 | 9/1966 | United Kingdom ........... 260/37 PC |
| 1074204 | 6/1967 | United Kingdom . |
| 1139413 | 1/1969 | United Kingdom . |
| 1190303 | 5/1970 | United Kingdom . |
| 1270077 | 4/1972 | United Kingdom . |
| 1422676 | 1/1976 | United Kingdom . |

OTHER PUBLICATIONS

E. P. Goldberg, "Elastomeric Polycarbonate Block Copolymers", *Journal of Polymer Science*, Part C, No. 4, pp. 707-730.
S. H. Merrill et al., "Block Copolymers Based on 2,2--bis(4-hydroxyphenyl)propane Polycarbonate...", *J. of Poly. Sci.*, Pt. A, vol. 3, pp. 2189-2203, (1965).
S. H. Merrill, "Block Copolymers based on 2,2-bis(-4-hydroxyphenyl)propane Polycarbonate...", J. Poly. Sci., vol. 55, pp. 343-352, (1961).

*Primary Examiner*—Sandra M. Person
*Attorney, Agent, or Firm*—Gene Harsh; Lawrence S. Pope

[57] ABSTRACT

Thermoplastic molding compositions are provided comprising from about 80 to 98% by weight of a polycarbonate obtained from diphenols, having a mean weight-average molecular weight $\bar{M}_w$ from about 10,000 to 200,000 and from about 20 to 2% by weight of a polyester-carbonate and/or polyether-carbonate with mean weight-average molecular weights $\bar{M}_w$ of from about 50,000 to 300,000, which contain between about 50 and 70% by weight of soft polyester segments or soft polyether segments with mean number-average molecular weights $\bar{M}_n$ of from about 10,000 to 20,000. The instant invention also relates to a process for the production of said thermoplastic molding compositions. These thermoplastic molding compositions show markedly improved resilience properties compared with known polycarbonates and can be employed as films and shaped articles in all cases where, on the one hand, high notched impact strength at low temperatures, high toughness properties at relatively high wall thicknesses, and transparency are required.

8 Claims, No Drawings

POLYCARBONATE MOLDING COMPOSITIONS WITH IMPROVED RESILIENCE PROPERTIES

BACKGROUND OF THE INVENTION

Polycarbonates obtained from diphenols are known and, because of their good mechanical, thermal and electrical properties, have gained acceptance in many fields of industrial use.

A certain disadvantage of the polycarbonates obtained from diphenols is that their resilience properties such as, for example, their notched impact strength and their splintering properties, are inadequate for special applications at low temperatures. A further disadvantage is that the toughness in the case of high wall thicknesses is sometimes inadequate. The tough fracture occurring at low wall thicknesses turns into a brittle fracture at higher wall thicknesses. The transition region is called the "critical thickness" (4 to 6 mm).

It is known to improve the resilience properties of polycarbonates obtained from diphenols by, for example, admixing ABS graft copolymers: compare, for example, German Pat. No. 1,170,141 and German Published Patent Specification No. 1,900,756 which corresponds to U.S. Pat. No. 3,663,471. However, disadvantages are the loss in transparency and the deterioration of some thermal properties, such as, for example, the heat distortion point according to DIN 53,460.

It has now surprisingly been found that by admixing polyether-carbonates and/or polyester-carbonates, products are obtained which are distinguished by improved resilience properties compared with known polycarbonates, especially at low temperatures and at increased critical thickness, while retaining other typical polycarbonate properties such as transparency and heat distortion point.

SUMMARY OF THE INVENTION

The present invention relates to thermoplastic molding compositions consisting of (a) from about 80–98% by weight, preferably from about 85–95% by weight, of polycarbonates having the repeating units given by the formula I, obtained from diphenols, with a mean weight-average molecular weight $\overline{M}_w$ of between about 10,000 and 200,000, preferably between about 20,000 and 80,000

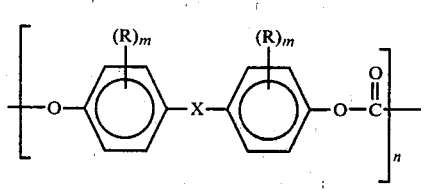

and (b) from about 20–2% by weight, preferably from about 15–5% by weight, relative to the total weight of the mixture, of polyester-carbonates having the repeating units given by the formula II a, polyether-carbonates having the repeating units given by the formulae II b or mixtures thereof with mean weight-average molecular weights $\overline{M}_w$ of between about 50,000 and 300,000, preferably between about 70,000 and 150,000, which contain from about 50 to 70% by weight of soft polyester segments B or soft polyether segments C with mean number-average molecular weights $\overline{M}_n$ of between about 10,000 and 20,000, preferably between about 12,000 and 18,000

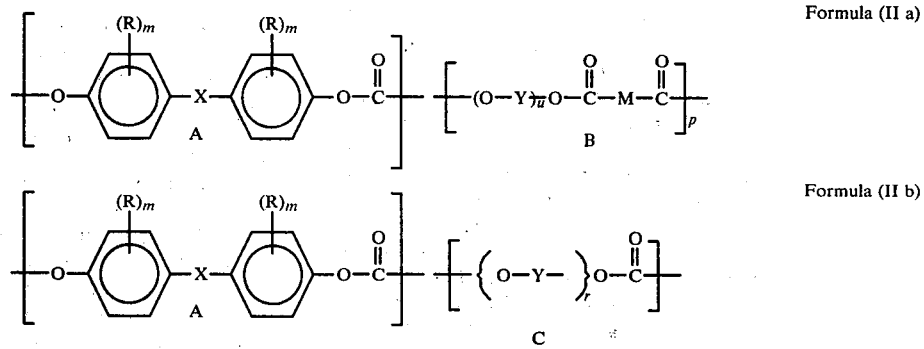

wherein in the formulae I, IIa and IIb,

R denotes hydrogen, chlorine, bromine or saturated alkyl substituents with 1 to 3 C atoms, M denotes 0, 1 or 2, X denotes a bond, $C_1$–$C_8$-alkylidene, $C_2$–$C_8$-alkylidene, $C_5$–$C_{15}$-cycloalkylene, $C_5$–$C_{15}$-cycloalkylidene, $SO_2$, $SO$, $O$, $CO$ or

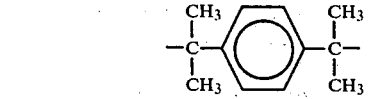

n denotes 20–400, u denotes 1–50, p denotes 50–170, r denotes 65–450,

Y denotes a $C_2$–$C_{15}$ linear or branched alkylene and

M denotes a bond, $C_1$–$C_{15}$-alkylene, $C_5$–$C_{12}$-cycloalkylene, $C_6$–$C_{15}$-arylene or hetero-arylene.

Preferred arylene radicals M are phenylene radicals and preferred hetero-arylene radicals are 5-membered or 6-membered heterocyclic radicals.

The instant invention also relates to a process for the production of the above-mentioned thermoplastic molding compositions.

DETAILED DESCRIPTION OF THE INVENTION

Examples of aromatic dihydroxy compounds which are suitable for the preparation of the polycarbonates of the formular I which can be used according to the invention are: dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) sulphoxides, bis-(hydroxyphenyl) sulphones and α,α'-bis-(hydroxyphenyl)-diisopropylbenzenes, and their nuclear-alkylated and nuclear-halogenated compounds.

These and other suitable diphenols are described, for example, in U.S. Pat. Nos. 3,028,365, 2,999,835, 3,148,172, 3,271,368, 2,991,273, 3,271,367, 3,280,078, 3,014,891 and 2,999,846; in German Published Patent Specifications Nos. 1,570,703, 2,063,050, 2,063,052, 2,211,956 and 2,211,957; French Pat. No. 1,561,518 and in the monograph "H. Schnell, Chemistry and Physics of Polycarbonates, Interscience Publishers, New York, 1964."

Examples of preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, 1,1-bis-(4-hydroxyphenyl)-propane and 1,1-bis-(4-hydroxyphenyl)-butane.

Furthermore, the polycarbonates can be branched by incorporating small amounts, preferably amounts between about 0.05 and 2.0 mol % (relative to the diphenols employed), of compounds which are trifunctional or more than trifunctional, in particular those with three or more than three phenolic hydroxyl groups.

Polycarbonates of this type are described, for example, in German Published Patent Specification Nos. 1,570,533, 1,595,762, 2,116,974, 2,113,347 and 2,500,092; British Pat. No. 1,079,821 and U.S. Pat. No. 3,544,514.

The polycarbonates can essentially be prepared by two known processes (compare H. Schnell, Chemistry and Physics of Polycarbonates, Polymer Rev., Volume IX, page 27 et seq., Interscience Publishers):

1. Preparation of the polycarbonates in a heterogeneous phase system (phase boundary process) by reacting an aqueous sodium bisphenolate solution with phosgene in the presence of methylene chloride.

2. Preparation of the polycarbonates in a homogeneous phase system (pyridine process) by reacting the aromatic dihydroxy compound, dissolved in pyridine, with phosgene in the presence of methylene chloride.

Suitable polyesters for the preparation of the polyester-carbonates of the formula IIa which can be used according to the invention are polyesters which are obtained by reacting polyhydric, preferably dihydric and optionally also trihydric, alcohols with polybasic, preferably dibasic, carboxylic acids by known processes (see, for example, Houben-Weyl, Volume 8, page 516 et seq., Georg Thieme Verlag Stuttgart, 1952) and which have molecular weights $\overline{M}_n$ (number-average) up to about 20,000, preferably from about 12,000 to 18,000.

Examples of suitable alcohols are low-molecular weight aliphatic diols with about 2–15 C atoms, in particular linear or branched aliphatic diols with about 2–10 C atoms, such as, for example, ethylene glycol, propylene 1,2-glycol and 1,3-glycol, butylene 1,4-glycol and 2,3-glycol, hexane-1,6-diol, octane-1,8-diol, neopentyl-glycol and decane-1,10-diol, furthermore poly(alkylene oxide)-α,ω-diols, such as diethylene glycol, triethylene glycol, polyethylene glycol and poly(tetramethylene oxide)-α,ω-diols, random or block copolymers of ethylene oxide and 1,2-propylene oxide, and also polyformals (for example from hexane-1,6-diol and formaldehyde). Suitable dicarboxylic acids are aliphatic, cycloaliphatic and aromatic dicarboxylic acids, for example oxalic acid, malonic acid, adipic acid, suberic acid, azelaic acid, sebacic acid, decanedicarboxylic acid, terephthalic acid and isophthalic acid, and mixtures of these acids. Preferred suitable aliphatic dicarboxylic acids are those with about 2 to 12 C atoms.

Instead of the free carboxylic acids, it is also possible to use the carboxylic acid anhydrides or corresponding carboxylic acid esters of lower alcohols, or mixtures thereof, for the preparation of the polyesters.

Suitable polyethers for the preparation of the polyether-carbonates of the formula IIb which can be used according to the invention are (polyalkylene oxide)-diols with molecular weights $\overline{M}_n$ (number-average) up to about 20,000, preferably from about 12,000 to 18,000, which are prepared by known processes (see, for example, Winnacker-Küchler, Volume 4, 71, Carl Hanser Verlag, Munich 1972), such as for example polytetrahydrofurane-diols and polyethylene oxide-glycols.

The polyester-carbonates and polyether-carbonates of the general formulae IIa and IIb respectively are likewise essentially prepared by two known processes.

The preparation in a heterogeneous phase system by the phase boundary process is described, for example, by S. H. Merrill, J. Polymer Sci., 55, 343 (1961), and the preparation in a homogeneous phase system by the pyridine process is described, for example, by K. P. Perry, W. J. Jackson, Jr. and J. R. Caldwell, Ind. Eng. Chem. Prod. Res. Develop., 2, 246 (1963).

Working up is carried out by methods known for polycarbonates, for example by evaporating off the solvent in devolatilization extruders.

The molding compositions according to the invention, consisting of polycarbonates and polyester-carbonates and/or polyether-carbonates, are prepared in conventional mixing units, such as kneaders and screw extruders, or by mixing solutions of the two components and then isolating the molding composition via a devolatilization extruder.

The mixtures of polycarbonates and polyester-carbonates and/or polyether-carbonates can be employed as films and shaped articles in all cases where, on the one hand, high notched impact strengths at low temperatures, high toughness properties at relatively high wall thicknesses, and transparency are required.

The following examples are intended to illustrate the subject of the invention in more detail. The relative solution viscosities indicated are measured in methylene chloride at 25° C. and at a concentration of 5 g/l.

The properties of the molding compositions from Example 1 and of the molding compositions from Examples 5–12 are summarized in Table I.

EXAMPLES

Example 1 (Comparison Example)

About 454 parts of 4,4'-dihydroxydiphenyl-2,2-propane and 9.5 parts of p-tert.-butylphenol are suspended in 1.5 l of water. The oxygen is removed from the reaction mixture, in a 3-necked flask provided with a stirrer and gas inlet tube, by passing nitrogen through the reaction mixture for 15 minutes, while stirring. 355 parts of 45% strength sodium hydroxide solution and 1,000 parts of methylene chloride are then added. The mixture is cooled to 25° C. While maintaining this temperature by cooling, 237 parts of phosgene are passed in over a period of 120 minutes.

After 15–30 minutes, or after the absorption of phosgene has started, an additional amount of 75 parts of a 45% strength sodium hydroxide solution is added. 1.6 parts of triethylamine are added to the solution formed and the mixture is stirred for a further 15 minutes. A highly viscous solution is obtained, the viscosity of which is controlled by adding methylene chloride. The aqueous phase is separated off. The organic phase is washed with water until free from salts and free from alkali. The polycarbonate has a relative viscosity of 1.29, measured in a 0.5% strength solution of methylene chloride at 20° C. This corresponds to an approximate molecular weight, $\overline{M}_w$, of 32,000. The polycarbonate thus obtained is extruded and granulated.

Example 2 (Polyester-carbonate)

5 kg (0.38 mol) of a polyester of butanediol and adipic acid, with terminal hydroxyl groups and a molecular weight of 13,000, are dissolved in 30 l of methylene chloride. 320 ml (4.7 mols) of phosgene, dissolved in 5 l of methylene chloride, are added to this solution at 18° C. in the course of half an hour. The solution is stirred for 40 minutes and an aqueous bisphenolate solution consisting of 5 kg (22 mols) of bisphenol A and 29.5 kg (48 mols) of 6.5% strength sodium hydroxide solution is then added.

80 l of methylene chloride and 33 g (0.2 mol) of p-t-butylphenol, as a chain stopper, are added. 400 g (4 mols) of phosgene are passed into the reaction mixture at a pH value of 13 at 20° C. in the course of one hour. An additional 53.6 kg (87 mols) of 6.5% strength sodium hydroxide solution are required to maintain the pH value. After passing in the phosgene, 500 ml of 4% strength triethylamine solution are added as a condensation catalyst and the mixture is stirred for 1 hour in order to carry out a post-condensation reaction. The polyester-carbonate is worked up by evaporating off the solvent. A polyester-carbonate with a relative viscosity of 1.998 is obtained.

Example 3a (Polyester-carbonate)

A polyester comprising 10.5 kg (1.27 mols) of a polyester of hexanediol and sebacic acid, and a molecular weight of 18,000, and 4.5 kg (19.7 mols) of bisphenol A are reacted with phosgene in accordance with the process described in Example 2, without a chain stopper, to give a polyester-carbonate with a relative solution viscosity of 2.305.

Example 3b (Polyester-carbonate)

A polyester comprising 10.5 kg (0.58 mol) of a polyester of hexane-1,6-diol and adipic acid, with a molecular weight of 14,000, and 4.04 kg (17.7 mols) of bisphenol A are reacted with phosgene in accordance with the process described in Example 2 to give a polyester-carbonate with a relative solution viscosity of 2.16.

Example 3c (Polyester-carbonate)

A polyester comprising 7.5 kg (0.75 mol) of a polyester of octane-1,8-diol/propylene 1,3-glycol (1:1) and suberic acid, with a molecular weight of 10,000, and 6.87 kg (24.2 mols) of tetramethylbisphenol A are reacted with phosgene in accordance with the process of DT-OS No. 2211 957 (Le A 14 240) to give a polyester-carbonate with a relative solution viscosity of 1.75.

Example 3d (Polyester-carbonate)

A polyester comprising 7.5 kg (0.75 mol) of a polyester of ethylene glycol/butane-1,4-diol and adipic acid, with a molecular weight of 10,000, and 6.1 kg (26.6 mols) of bisphenol A and 0.7 kg (1.9 mols) of tetrachlorobisphenol A are reacted with phosgene in accordance with the process described in Example 2 to give a polyester-carbonate with a relative solution viscosity of 1.85.

Example 3e (Polyester-carbonate)

A polyester comprising 9.0 kg (0.56 mol) of hexane-1,6-diol/butane-1,4-diol (75:25) and sebacic acid, with a molecular weight of 16,000, and 4.6 kg (20.1 mols) of bisphenol A and 0.9 kg (1.58 mols) of tetrabromobisphenol A are reacted with phosgene in accordance with the process described in Example 2 to give a polyester-carbonate with a relative solution viscosity of 2.02.

Example 4a (Polyether-carbonate)

5.25 kg (0.33 mol) of a polyethylene oxide-glycol with a molecular weight of 16,000 and 4.5 kg (19.7 mols) of bisphenol A are reacted with phosgene in accordance with the process described in Example 2 to give a polyether-carbonate with a relative solution viscosity of 1.89.

Example 4b (Polyether-carbonate)

9.0 kg (0.90 mol) of a polyethylene oxide-glycol with a molecular weight of 10,000, with 5.4 kg (23.6 mols) of bisphenol A are reacted with phosgene in accordance with the process described in Example 2 to give a polyether-carbonate with a relative solution viscosity of 1.93.

Example 4c (Polyether-carbonate)

7.5 kg (0.47 mol) of a poly-(1,2-propylene oxide)-glycol, with a molecular weight of 16,000, and 6.7 kg (29.5 mols) of bisphenol A are reacted with phosgene in accordance with the process described in Example 2 to give a polyether-carbonate with a relative solution viscosity of 1.84.

Example 4d (Polyether-carbonate)

9.0 kg (0.6 mol) of a poly-(1,2-butylene oxide)-glycol, with a molecular weight of 15,000, and 5.5 kg (19.4 mols) of bisphenol A are reacted with phosgene in accordance with the process described in Example 2 to give a polyether-carbonate with a relative solution viscosity of 1.78.

Example 4e (Polyether-ester-carbonate)

10.5 kg (1.05 mols) of a polyether-ester comprising 96.46% by weight of a polybutanediol ($\overline{M}_n$ 2,000) and 4.69% by weight of adipic acid and with a molecular weight of 10,000, and 4.0 kg (17.5 mols) of bisphenol A are reacted with phosgene in accordance with the process described in Example 2 to give a polyether-ester-carbonate with a relative solution viscosity of 2.43.

Example 5

85 Parts by weight of the polycarbonate from Example 1 are mixed with 15 parts by weight of the polyester-carbonate from Example 2, as a solution in methylene chloride, and the mixture is extruded through a devolatilization extruder at 320° C. and under 0.1 mm Hg. The relative solution viscosity is 1.322.

Example 6

95 Parts by weight of the polycarbonate from Example 1 and 5 parts by weight of the polyester-carbonate from Example 2 are mixed, in the form of granules, and the mixture is extruded through a twin-screw extruder at 320° C. The relative solution viscosity is 1.297.

Example 8

92 Parts by weight of the polycarbonate from Example 1 and 8 parts by weight of the polyether-carbonate from Example 4a are mixed, in the form of solutions in methylene chloride, and the mixture is extruded through a devolatilization extruder at 320° C. and under 0.1 mm Hg. The relative solution viscosity is 1.298.

Example 9

96 Parts by weight of a polycarbonate from Example 1 and 4 parts by weight of the polyester-carbonate from Example 3c are mixed, in the form of granules, and the mixture is extruded through a twin-screw extruder at 320° C. The relative solution viscosity is 1.31.

Example 10

88 Parts by weight of a polycarbonate from Example 1 are mixed with 12 parts by weight of a polyester-carbonate from Example 3d, in the form of granules, and the mixture is extruded through a twin-screw extruder at 320° C. The relative solution viscosity is 1.33.

Example 11

90 Parts by weight of a polycarbonate from Example 1 and 10 parts by weight of a polyether-ester-carbonate from Example 4e are mixed, in the form of granules, and the mixture is extruded through a twin-screw extruder at 320° C. The relative solution viscosity is 1.35.

Example 12

85 Parts by weight of a polycarbonate from Example 1 and 15 parts by weight of a polyether-carbonate from Example 4c are mixed, in the form of solutions in methylene chloride, and the mixture is extruded through a devolatilization extruder at 320° C. and under 0.1 mm Hg. The relative solution viscosity is 1.31.

Table I

| | Content of polyester-carbonate or polyether-Carbonate in the mixture | Molecular weight of the soft segment $M_n$ | Notched impact strength + kJ/m² room temperature | −20 | −40° C. | Vicat B ++ °C. | Critical thickness +++ mm |
|---|---|---|---|---|---|---|---|
| Example 1 (Comparison Example) | — | — | 35 | 22 | 10 | 150 | 5.7–6 |
| Example 5 | 15 | 13,000 | 40 | 39 | 20 | 145 | >9 |
| Example 6 | 5 | 13,000 | 44 | 30 | 15 | 148 | 7.1–7.4 |
| Example 7 | 10 | 18,000 | 42 | 35 | 18 | 146 | >9 |
| Example 8 | 8 | 16,000 | 41 | 35 | 20 | 147 | >9 |
| Example 9 | 4 | 10,000 | 46 | 34 | 16 | 148 | 7.4–7.7 |
| Example 10 | 12 | 10,000 | 42 | 38 | 19 | 145 | >9 |
| Example 11 | 10 | 10,000 | 43 | 36 | 18 | 146 | 7.4–7.7 |
| Example 12 | 15 | 16,000 | 40 | 32 | 20 | 145 | >9 |

+DIN 53,453
++DIN 53,460
+++Izod, ASTM-0256

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A thermoplastic molding composition comprising
(a) from about 80 to 98% by weight of a polycarbonate having the repeating units given by the general formula (I), obtained from diphenols, with a mean weight-average molecular weight $\overline{M}_w$ of between about 10,000 and 200,000

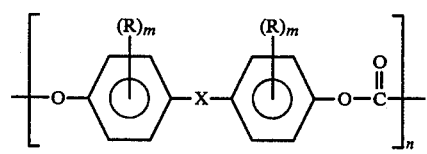

and
(b) from about 20 to 2% by weight relative to the total weight of the mixture, of a polyester-carbonate having the repeating units given by the general formula (IIa), polyether-carbonate having the repeating units given by the general formula (IIb) or mixtures thereof with mean weight-average molecular weights $\overline{M}_w$ of between about 50,000 and 300,000 which contain from about 50 to 70% by weight of soft polyester segments B or soft polyether segments C with mean number-average molecular weights $\overline{M}_n$ of between about 10,000 and 20,000

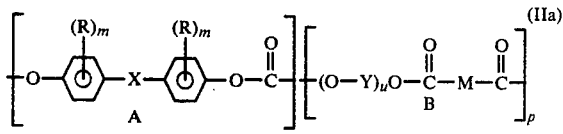

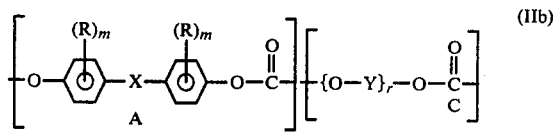

in which, in the formulae (I), (IIa), and (IIb),

R denotes a hydrogen, chlorine or bromine atom or a saturated alkyl group with 1 to 3 carbon atoms, m is 1 or 2, X denotes a bond or a $C_1$ to $C_8$ alkylene, $C_2$ to $C_8$ alkylidene, $C_5$ to $C_{15}$ cycloalkylene, $C_5$ to $C_{15}$ cycloalkylidene, $SO_2$, $SO$, $O$, $CO$ or

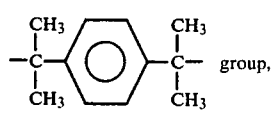 group, n is 20 to 400,
u is 1 to 50,
p is 50 to 170,
r is 65 to 450

Y denotes a $C_2$ to $C_{15}$ linear or branched alkylene group and

M denotes a bond or a $C_1$ to $C_{15}$ alkylene, $C_5$ to $C_{12}$ cycloalkylene, $C_6$ to $C_{15}$ arylene or hetero-arylene group.

2. The thermoplastic molding composition according to claim 1, comprising about 85 to 95% by weight of component (a) and about 15 to 5% by weight of component (b).

3. The thermoplastic molding composition of either claims 1 or 2, wherein the molecular weight $\overline{M}_w$ of the polycarbonate of formula (I) is between about 20,000 and 80,000.

4. The thermoplastic molding composition of either claims 1 or 2, wherein the molecular weight $\overline{M}_w$ of the polyester polycarbonate and/or polyether-polycarbonate of formulae (IIa) and (IIb) is between about 70,000 and 150,000 and the molecular weight $\overline{M}_n$ of segments B and C is between about 12,000 and 18,000.

5. The thermoplastic molding composition of either claims 1 or 2, wherein the soft polyester segments of the polyester-carbonate are obtained from an aliphatic diol with between about 2 and 10 carbon atoms and an aliphatic dicarboxylic acid with between about 2 and 12 carbon atoms.

6. The thermoplastic molding composition of either claims 1 or 2, wherein the soft polyether segments of the polyether-carbonate are obtained from a (polyalkylene oxide)-diol with a molecular weight $\overline{M}_n$ up to about 20,000.

7. Thermoplastic molding compositions comprising
(a) from about 80 to 98% by weight of a polycarbonate having the repeating units given by the general formula (I), obtained from diphenols, with a mean weight-average molecular weight $\overline{M}_w$ of between about 10,000 and 200,000

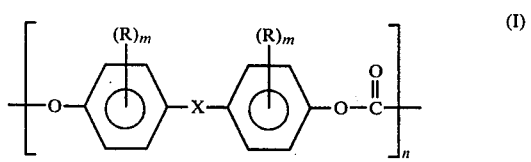

and (b) from about 20 to 2% by weight, relative to the total weight of the mixture, of either (i) a polyester-carbonate having the repeating units given by the general formula IIa which contains from about 50 to 70% by weight of soft polyester segments B with mean number-average molecular weights $\overline{M}_n$ of between about 10,000 and 20,000

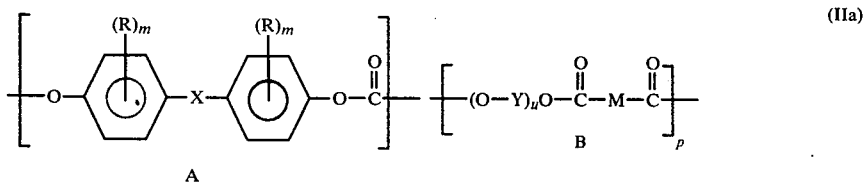

(ii) a polyether carbonate having the repeating units given by the general formula IIb which contains from about 50 to 70% by weight of soft polyether segments C with mean number-average molecular weights $\overline{M}_n$ of between about 10,000 and 20,000

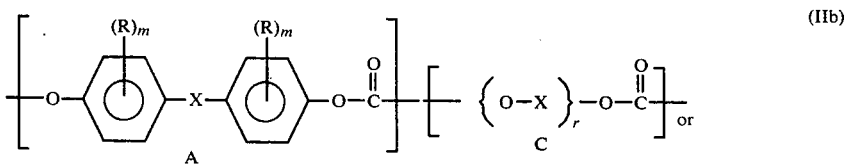

(iii) mixtures of (i) and (ii), characterized in that component (b) has a mean weight-average molecular weight $\overline{M}_w$ of between about 50,000 and 300,000 and in the formulae I, IIa and IIb R denotes a hydrogen, chlorine or bromine atom or a saturated alkyl group with 1 to 3 carbon atoms, m is 1 or 2, X denotes a bond or a $C_1$ to $C_8$ alkylene, $C_2$ to $C_8$ alkylidene, $C_5$ to $C_{15}$ cycloalkylene, $C_5$ to $C_{15}$ cycloalkylidene, $SO_2$, SO, O, CO or

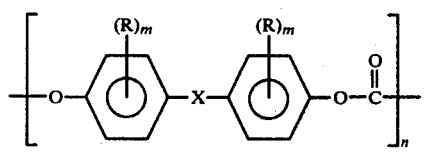 group, n is 20 to 400,
u is 1 to 50,
p is 50 to 170,
r is 65 to 450,
Y denotes a $C_2$ to $C_{15}$ linear or branched alkylene group and
M denotes a bond or a $C_1$ to $C_{15}$ alkylene, $C_5$ to $C_{12}$ cycloalkylene, $C_6$ to $C_{15}$ arylene or hetero-arylene group.

8. A process of making a polymer blend comprising mixing
(a) from about 80 to 98% by weight of a polycarbonate having the repeating units given by the general formula (I), obtained from diphenols, with a mean weight-average molecular weight $\overline{M}_w$ of between about 10,000 and 200,000

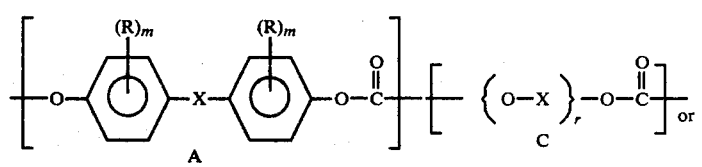

and
(b) from about 20 to 2% by weight relative to the total weight of the mixture of either (i) a polyester-carbonate having the repeating units given by the general formula IIa which contains from about 50 to 70% by weight of soft polyester segments B with mean number-average molecular weights $\overline{M}_n$ of between about 10,000 and 20,000

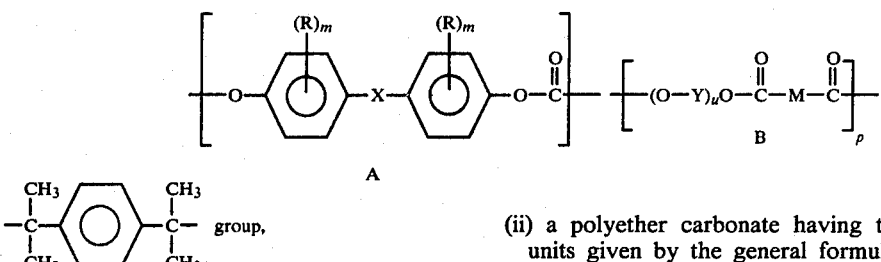

(ii) a polyether carbonate having the repeating units given by the general formula IIb which contains from about 50 to 70% by weight of soft polyether segments C with mean number-average molecular weights $\overline{M}_n$ of between about 10,000 and 20,000

(iii) mixtures of (i) and (ii),
characterized in that component (b) has a mean weight-average molecular weight $\overline{M}_w$ of between about 50,000 and 300,000 and in the formulae I, IIa and IIb
R denotes a hydrogen, chlorine or bromine atom or a saturated alkyl group with 1 to 3 carbon atoms,
m is 1 or 2,
X denotes a bond or a $C_1$ to $C_8$ alkylene, $C_2$ to $C_8$ alkylidene, $C_5$ to $C_{15}$ cycloalkylene, $C_5$ to $C_{15}$ cycloalkylidene, $SO_2$, SO, O, CO or

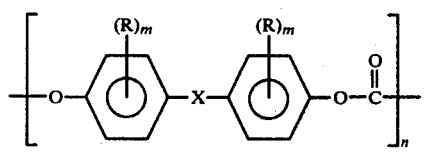 group, n is 20 to 400,
u is 1 to 50,
p is 50 to 170
r is 65 to 450,
Y denotes a $C_2$ to $C_{15}$ linear or branched alkylene group and
N denotes a bond or a $C_1$ to $C_{15}$ alkylene, $C_5$ to $C_{12}$ cycloalkylene, $C_6$ to $C_{15}$ arylene or hetero-arylene group.

* * * * *